(12) United States Patent
Bass

(10) Patent No.: US 6,854,561 B2
(45) Date of Patent: Feb. 15, 2005

(54) HANGER SYSTEMS AND METHODS

(76) Inventor: Trampas N. Bass, P.O. Box 7207, Tifton, GA (US) 31793

( * ) Notice: Subject to any disclaimer, the term of this patent is extended or adjusted under 35 U.S.C. 154(b) by 42 days.

(21) Appl. No.: 10/113,153

(22) Filed: Apr. 1, 2002

(65) Prior Publication Data

US 2002/0113173 A1 Aug. 22, 2002

Related U.S. Application Data

(63) Continuation-in-part of application No. 09/714,307, filed on Nov. 16, 2000, now Pat. No. 6,405,826.
(60) Provisional application No. 60/244,860, filed on Nov. 1, 2000.

(51) Int. Cl.$^7$ .............................. F01N 7/08; E21F 17/02; F16L 3/01; B60K 13/04
(52) U.S. Cl. ........................ 181/228; 248/62; 248/58; 248/610; 248/73; 180/309; 180/89.2
(58) Field of Search ................................. 181/228, 207, 181/209, 227, 282; 248/60, 62, 58, 74.1, 74.2, 610, 73; 180/309, 89.2, 296; 285/199, 197

(56) References Cited

U.S. PATENT DOCUMENTS

| | | | |
|---|---|---|---|
| 3,261,579 A | 7/1966 | Engman et al. | |
| 3,292,887 A | 12/1966 | Cassel et al. | 248/60 |
| 3,960,232 A | 6/1976 | Hubbell, III | 180/64 |
| 4,004,768 A | 1/1977 | Evans et al. | 248/59 |
| 4,063,700 A | 12/1977 | Brewer | 248/62 |
| 4,116,411 A | 9/1978 | Masuda | 248/60 |
| 4,309,019 A | 1/1982 | Bloom | 248/610 |
| 4,361,304 A | 11/1982 | Younger | 248/544 |
| 4,550,795 A * | 11/1985 | Teshima | 180/296 |
| 4,638,965 A * | 1/1987 | De Bruine et al. | 248/59 |
| 4,756,383 A | 7/1988 | Sterett | 181/243 |
| 4,790,502 A * | 12/1988 | Saegusa | 248/74.1 |
| 4,796,841 A | 1/1989 | Baker et al. | 248/60 |
| 4,824,056 A * | 4/1989 | Wuebker et al. | 248/60 |
| 4,844,379 A | 7/1989 | Umehara | 248/74.3 |
| 4,932,619 A * | 6/1990 | Usui | 248/74.1 |
| 5,028,021 A | 7/1991 | Sugiyama et al. | 248/74.5 |
| H968 H | 10/1991 | Moyles | 248/74.5 |
| 5,197,698 A * | 3/1993 | Bartholomew | 248/60 |
| 5,649,685 A * | 7/1997 | Keller | 248/638 |
| 5,950,975 A | 9/1999 | Aieske | 248/291.1 |

FOREIGN PATENT DOCUMENTS

| | | | | |
|---|---|---|---|---|
| JP | 06093852 A | * | 4/1994 | F01N/7/00 |
| JP | 2002264667 A | * | 9/2002 | B60K/13/04 |

OTHER PUBLICATIONS

"Wire Swivel Hangers," Exhaust Hardware Additions, Apr. 2002, Nickson Industries, Inc.

(List continued on next page.)

Primary Examiner—Edgardo San Martin
(74) Attorney, Agent, or Firm—Thomas, Kayden, Horstemeyer & Risley, LLP

(57) ABSTRACT

Hanger systems are provided for securing exhaust systems to the undercarriage of the automobile. One such system includes a hanger that incorporates an arm, a bushing defining an orifice, a retaining member, and a flange. The orifice receives a proximal end of the arm, which is loosely retained by the bushing so that the arm is able to rotate. The retaining member engages an exterior surface of the bushing and is formed, at least partially, of a strip of material. At least a portion of the strip of material is shaped to conform to at least a portion of the exterior surface of the bushing. The flange extends outwardly from the bushing. So configured, the hanger mounts to the automobile by attaching the flange to the frame member. The arm can be secured to a portion of the exhaust system so that the exhaust pipe is securely retained. Methods and other systems also are provided.

26 Claims, 7 Drawing Sheets

OTHER PUBLICATIONS

Exhibits 1a and 1b—two color photographs of an original equipment hanger on a 1994 Jeep Wrangler.
Exhibits 2a and 2b—two pages of Chrysler OE material for the 1995 Jeep Wrangler, one page being a schematic drawing and the other page being a parts list.

Exhibit 3a, 3b and 3c—three pages from the 1995 Jeep Wrangler service manual.
Exhibits 4a, 4b, 4c and 4d—four pages from a 1998 catalogue of Nickson Industries.

* cited by examiner

HANGER SYSTEMS AND METHODS

CROSS-REFERENCE TO RELATED APPLICATIONS

This application is a Continuation-In-Part Application, which claims the benefit of and priority to U.S. Utility patent application Ser. No. 09/714,307, filed on Nov. 16, 2000, now U.S. Pat. No. 6,405,826, which claims the benefit of and priority to U.S. Provisional Patent Application Ser. No. 60/244,860, filed on Nov. 1, 2000, both of which are incorporated herein by reference.

BACKGROUND OF THE INVENTION

1. Field of the Invention

The present invention generally is related to hangers and, in particular, to systems and methods that involve the use of a hanger, which includes a swivel arm adapted for securing a muffler to an undercarriage of automobile, for instance.

2. Description of the Related Art

Heretofore, numerous devices such as clamps and hangers, for example, have been utilized for securing apparatuses, such as mufflers, exhaust pipes, etc., to the underside of automobiles. These devices, however, have met with various degrees of success, with those devices possessing the highest degree of success typically possessing characteristics of ease of installation and low cost Typically, much of the cost associated with such devices, particularly those devices utilized for securing exhaust pipes, has been associated with the necessity to produce the device in various sizes so that various sizes and configurations of exhaust pipes may be accommodated. Heretofore, however, there have been few devices that, without being produced in various sizes, have been configured to easily accommodate various sizes and configurations of exhaust pipes.

Therefore, there is a need for improved devices, systems and methods which address these and other shortcomings of the prior art.

SUMMARY OF THE INVENTION

Briefly described, the present invention relates to hangers for securing mufflers to the undercarriages of automobiles, for instance. In a preferred embodiment, a hanger system of the invention includes a hanger that incorporates an arm, a bushing, a retaining member, and a flange. An orifice of the bushing receives a proximal end of the arm, which is loosely retained by the bushing so that the arm is able to rotate. The retaining member engages an exterior surface of the bushing and is formed, at least partially, of a strip of material. At least a portion of the strip of material is shaped to conform to at least a portion of the exterior surface of the bushing. The flange extends outwardly from the bushing. So configured, the hanger mounts to the automobile by attaching the flange to the frame member. Thus, the bushing is fixedly retained by the frame member. The arm can be secured to a portion of the exhaust system so that the exhaust pipe is securely retained by the undercarriage of the automobile.

Some embodiments of the present invention may be construed as methods for securing an exhaust pipe to the undercarriage of an automobile. One such embodiment includes: providing a hanger, such as described before; attaching a flange of the hanger to the frame member so that the bushing is retained; and attaching the arm to a portion of the exhaust system so that the exhaust pipe is retained by the undercarriage of the automobile.

Other features and advantages of the present invention will become apparent to one with skill in the art upon examination of the following drawings and detailed description. It is intended that all such features and advantages be included herein within the scope of the present invention, as defined in the appended claims.

BRIEF DESCRIPTION OF THE SEVERAL VIEWS OF THE DRAWINGS

The present invention, as defined in the claims, can be better understood with reference to the following drawings. The drawings are not necessarily to scale, emphasis instead being placed on clearly illustrating the principles of the present invention.

DETAILED DESCRIPTION OF A PREFERRED EMBODIMENT

Figure 1:
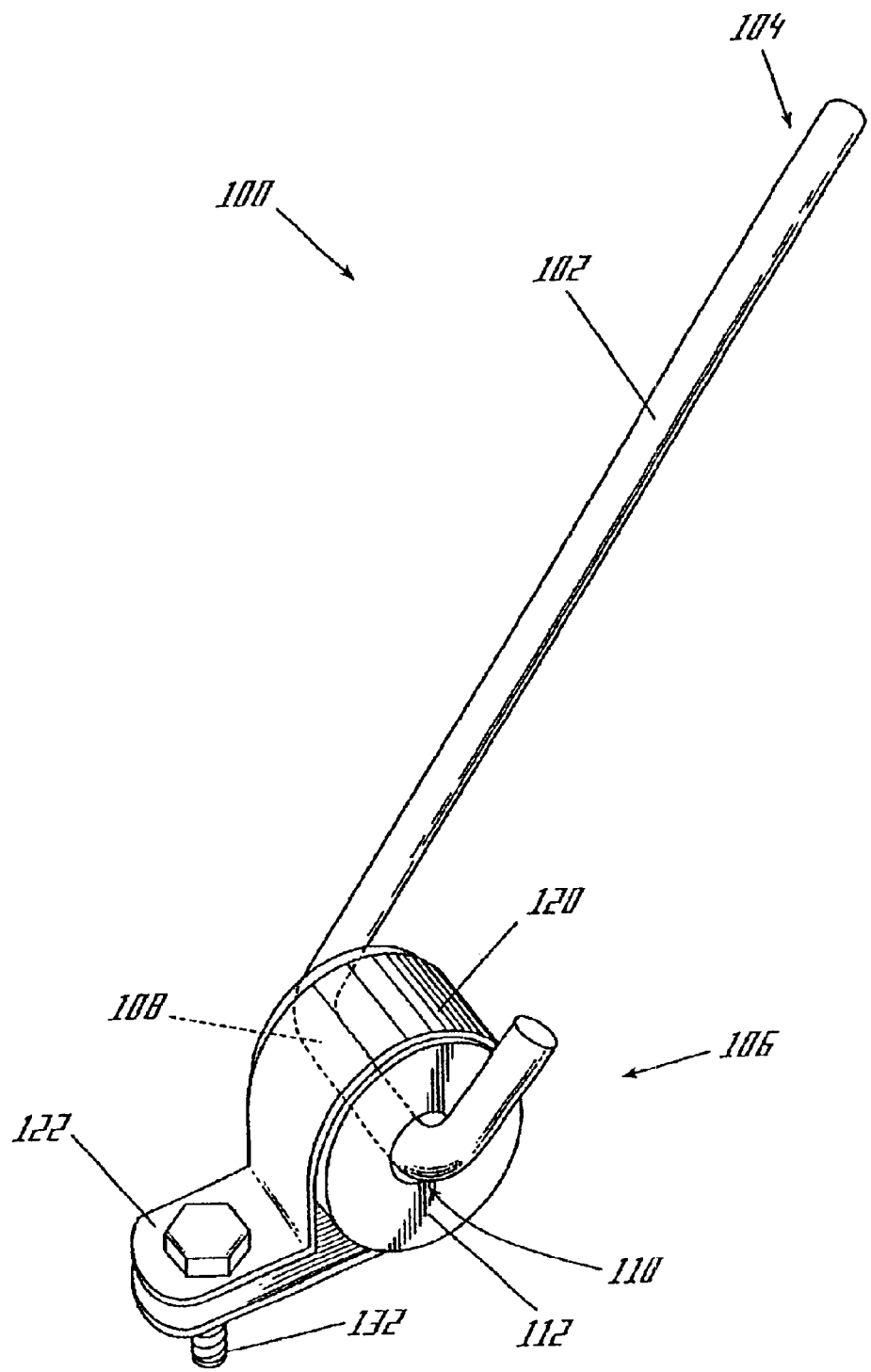
FIG. 1 is a perspective view of a preferred embodiment of the present invention.

Reference will now be made in detail to the description of the invention as illustrated in the drawings with like numerals indicating like parts throughout the several views. Referring now to FIG. 1, a preferred embodiment of the hanger 100 of the present invention incorporates an arm 102 which includes a free or distal end 104 and a captured or proximal end 106. Proximal end 106, which preferably is formed in a J-shaped configuration (although various other configurations may be utilized), includes a journal portion 108 which is adapted to be received within the orifice 110 of a bushing 112. Preferably, bushing 112 is formed of a shock absorbing material, such as rubber, for example, and is configured to capture the proximal end of the arm 102 so that the free end of the arm may be rotated through an arc without the arm easily detaching from the bushing. In some embodiments, such as the embodiment depicted in FIG. 1, the arm may rotate a full 360 degrees while being engaged within the bushing. Although the foregoing description of the cooperation of the swivel arm and bushing is representative of the preferred embodiment depicted in the accompanying figures, various other embodiments of the hanger may utilize configurations other than the one depicted provided that the arm is capable of rotating relative to the bushing.

Bushing 112 preferably is clamped about an exterior surface thereof by a retaining member 120 which preferably terminates at each of its ends to form a flanged portion 122. Flanged portion 122 is adapted to receive a mechanical fastener, such as a bolt of a bolt and nut assembly that, in addition to retaining each of the ends of the retainer member in proximity to each other, is adapted to secure the retainer member to another component such as a frame member of the undercarriage of an automobile, for example.

Figure 2:
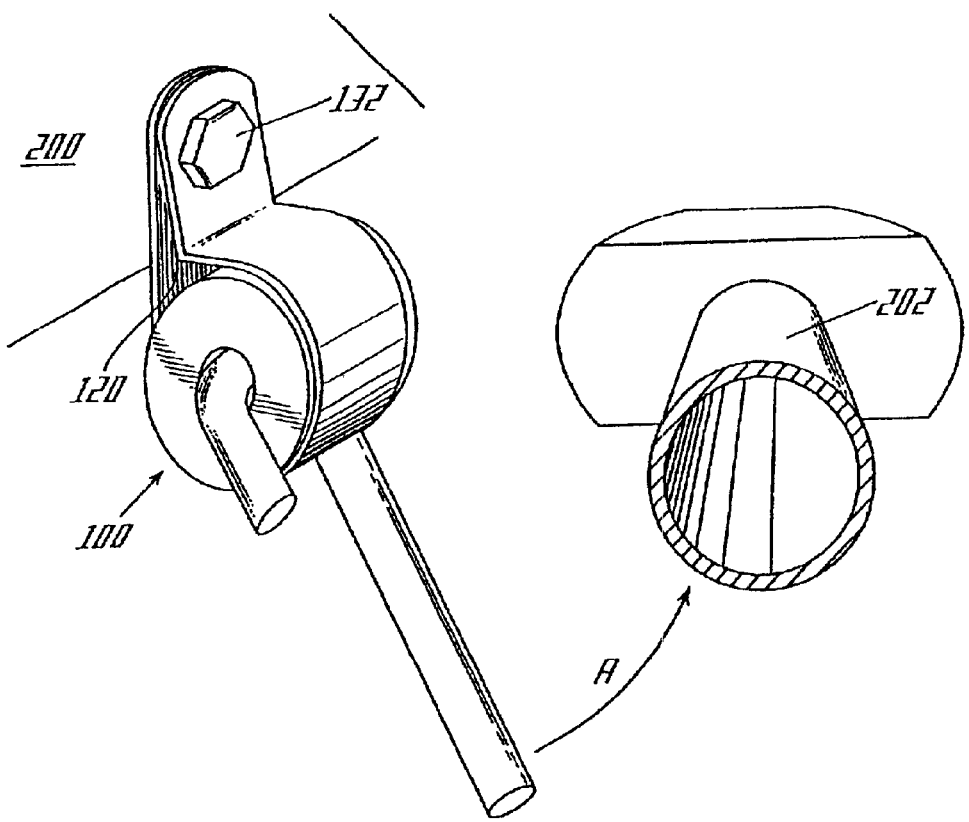
FIG. 2 is a perspective view of the embodiment of the invention depicted in FIG. 1 shown being secured to the underside of a representative automobile.
Figure 3:
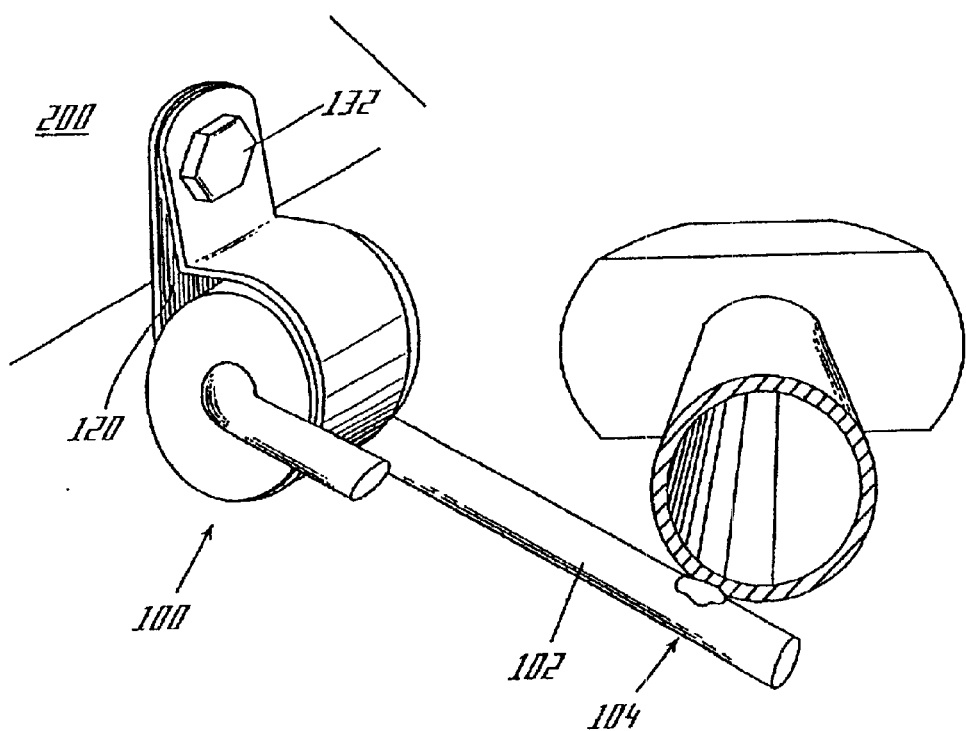
FIG. 3 is a perspective view of the embodiment of the invention depicted in FIGS. 1 and 2 shown installed on the underside of a representative automobile and securing a representative exhaust pipe.

Referring now to FIG. 2, preferred installation of the hanger 100 will now be described in greater detail. As shown in FIG. 2, hanger 100 and, more specifically, retainer member 120 is adapted to be secured to a frame member 200, or other suitable portion of an undercarriage of an automobile. For instance, in the embodiment depicted in FIG. 2, bolt 132 is received through frame member 200 and secured thereto by a nut (not shown). Once so secured, arm 102 may be rotated in direction A until a portion of the arm contacts a suitable portion of the exhaust system (see, FIG. 3), such as an exhaust pipe 202, for example. The arm may then be secured to that portion of the exhaust system, such as by welding, or any other suitable method for fixedly securing the arm to the frame member. So provided, the muffler, tailpipe and/or other associated components of an exhaust system may be suitably secured to the underside of the automobile by being retained by the hanger.

Additionally, it should be noted that the tendency of a rigid engagement between the exhaust system and the hanger, e.g., a rigid engagement formed by a weld, to fail due to vibration, for instance, may be reduced by the configuration of the bushing 112. More specifically, the material of the bushing, e.g., rubber, may act as a shock absorber, thereby reducing the tendency of such a rigid engagement to fail.

Figure 4:
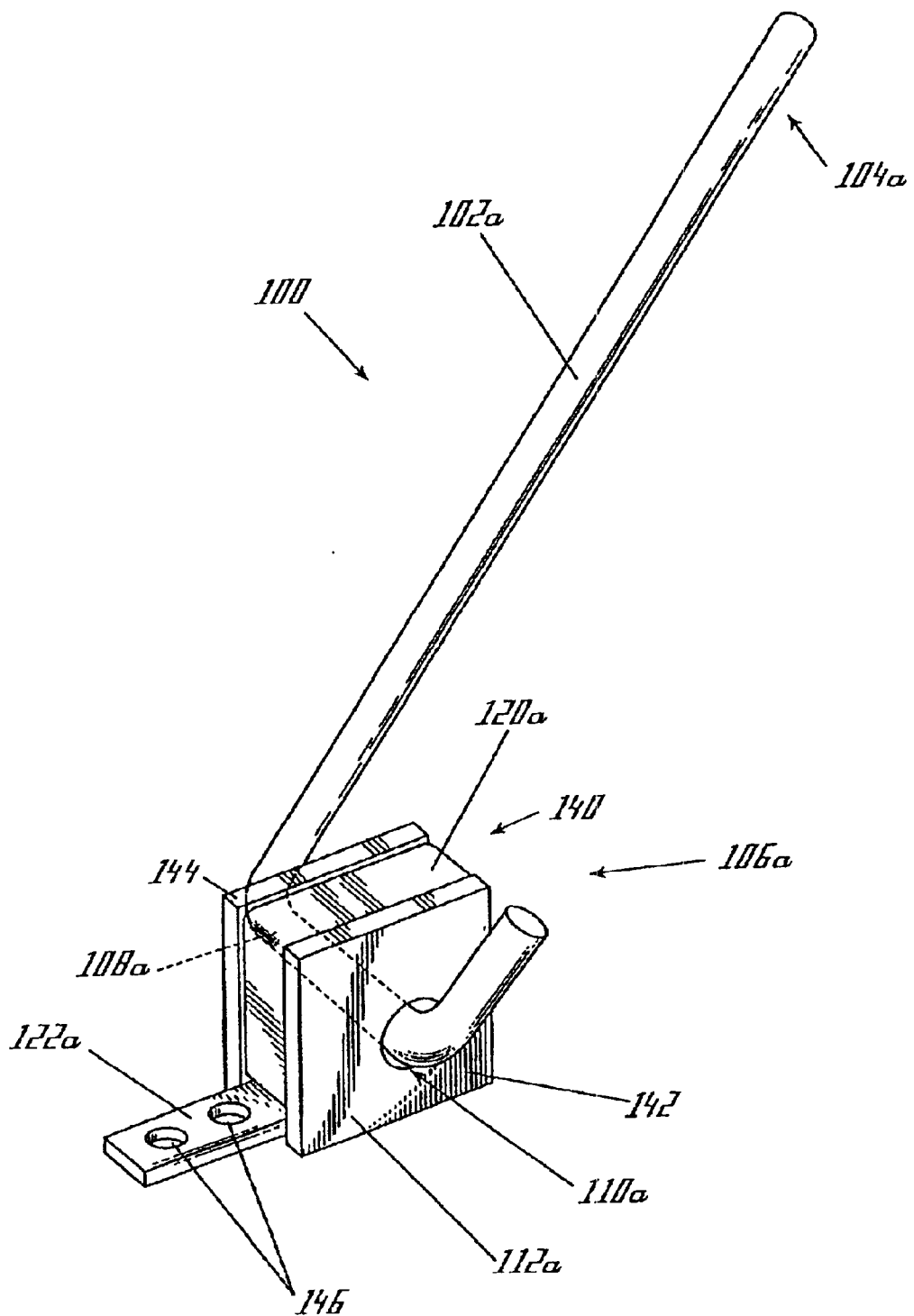
FIG. 4 is a perspective view of an alternative embodiment of the present invention.

Reference will now be made to FIG. 4, which depicts an alternative embodiment of the hanger 100. As shown in FIG. 4, arm 102a of the hanger includes a free or distal end 104a and a captured or proximal end 106a. Proximal end 106a, which preferably is configured as a J-shaped member, includes a journal portion 108a that is adapted to be received within the orifice 110a of a bushing 112a. Preferably, bushing 112a is formed of a shock absorbing material, such as rubber, for example, and is configured to capture the proximal end of the arm 102a.

Bushing 112a preferably is configured with an intermediate portion 140 that is disposed between end portions 142 and 144, respectively. End portions may be provided in various configurations, such as generally rectangular, as depicted in FIG. 4. The intermediate portion is adapted to receive thereabout a retaining member 120a which preferably terminates to form a flanged portion 122a. Flanged portion 122a is adapted to receive, such as by use of one or more holes 146, a mechanical fastener, e.g., a bolt of a bolt and nut assembly. So provided, the hanger 100 may be conveniently mounted to the undercarriage of an automobile, for instance, as described hereinbefore. Due to the preferred configuration of the end portions and intermediate portion of the bushing, e.g., the periphery of the end portions extend beyond the periphery of the intermediate portion and the retainer, an enhancement in performance may be achieved as the extended outer edge or periphery of the end portions may engage portions of the undercarriage to which it is attached, thereby potentially limiting direct metal-to-metal contact and accompanying wear.

Figure 5:
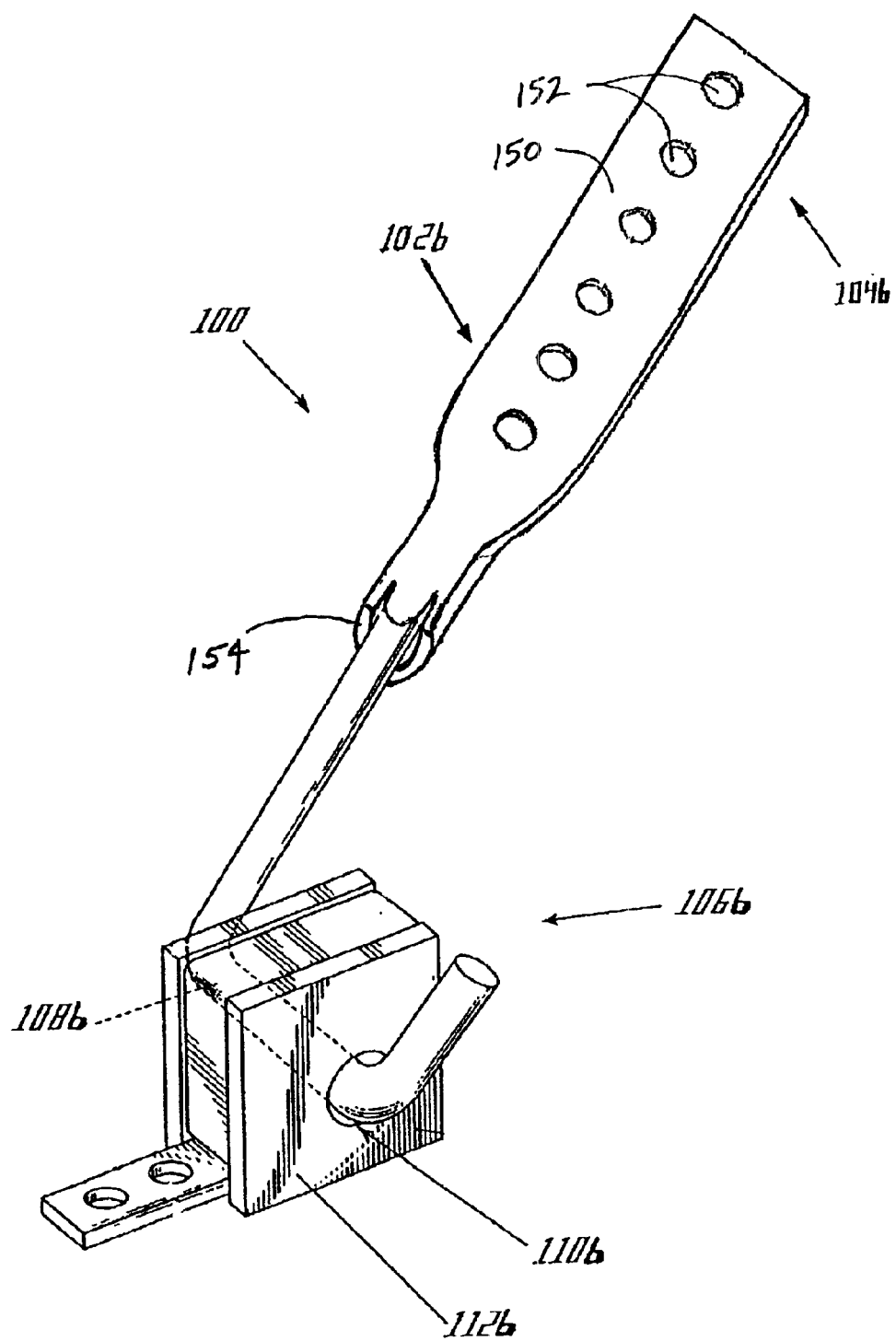
FIG. 5 is a perspective view of an alternative embodiment of the present invention.

Another embodiment of the hanger 100 is depicted in FIG. 5. As shown in FIG. 5, hanger 100 includes an arm 102b which includes a free or distal end 104b and a captured or proximal end 106b. Proximal end 106b which, in this embodiment, is configured as a J-shaped member, includes a journal portion 108b that is adapted to be received within orifice 110b of a bushing 112b. Preferably, bushing 112b is formed of a shock-absorbing material and is configured to capture the proximal end of the arm 102b. In this regard, retention of the arm by the bushing preferably is loose enough to permit the arm to rotate with respect to the bushing. Although the degree of rotation exhibited may vary between embodiments, preferably, the arm is able to rotate through 360 degrees. Note, journal portion 108b of the arm can be provided in various lengths. Thus, in the embodiment of FIG. 5, since the length of the journal portion is longer than the length of the orifice through the bushing, the arm may exhibit a degree of play with respect to the bushing. That is, in addition to being able to rotate with respect to the bushing, in some embodiments, the arm can slide back and forth along an axis defined by the orifice. The combination of play and rotatability exhibited by various embodiments may render these embodiments more suitable for use in securing components that do not provide a great deal of clearance for installing hangers.

With respect to die arm 102b, distal end 104b includes a clamp-retaining member 150. More specifically, clamp-retaining member 150 includes one or more holes 152 that are adapted to receive a corresponding bolt of a muffler clamp (shown in FIG. 6). In FIG. 5, the clampretaining member is formed as a flattened member that can be separately formed and then attached to the arm. By way of example, the flattened member can terminate in a curved attachment portion 154 within which a portion of the arm 102 can be placed and then affixed, such as by welding. Clearly, various other techniques can be used to form a clamp-receiving portion that is adapted to mate with a muffler clamp.

Figure 6A:
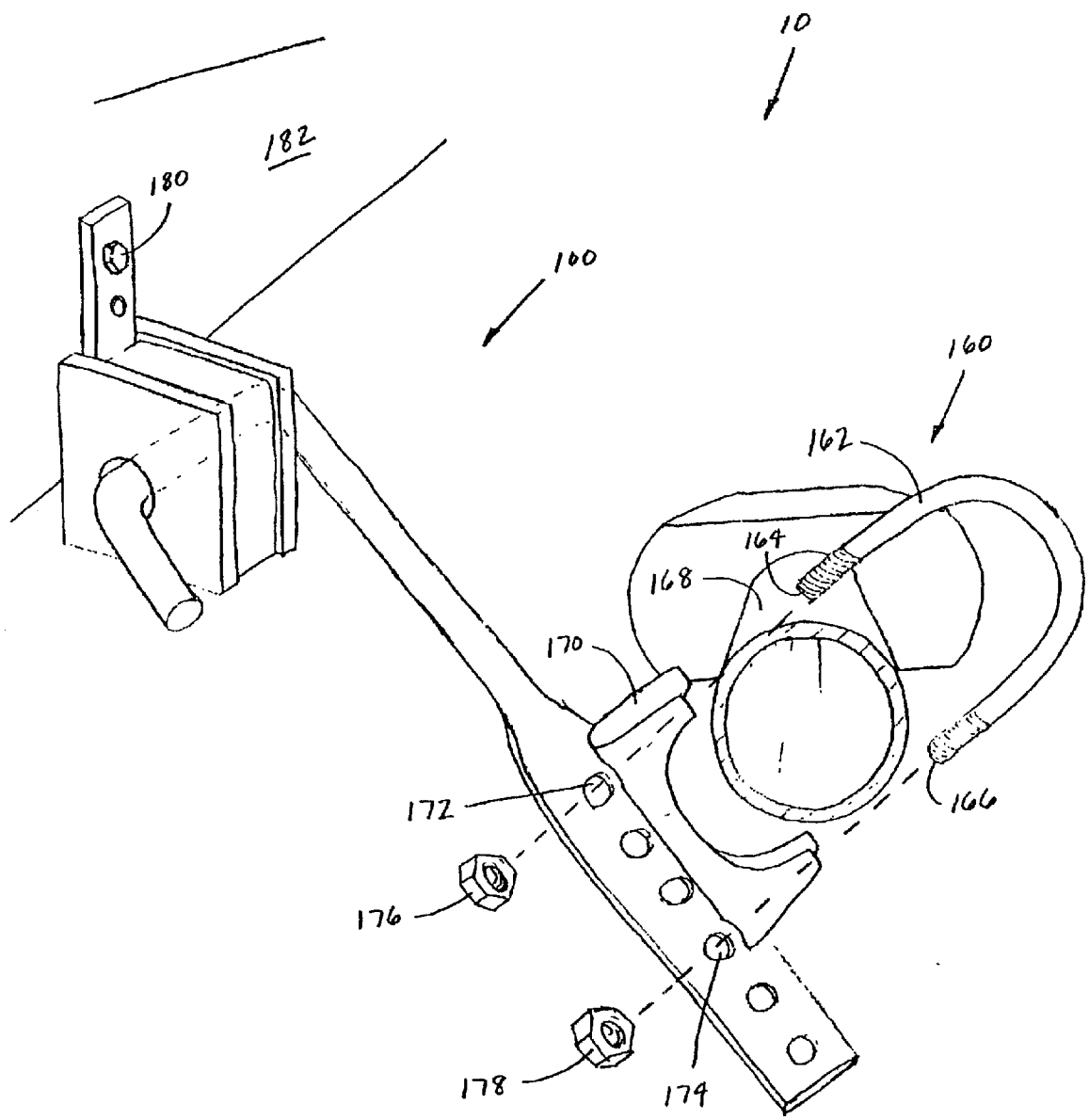
FIG. 6a is a partially-exploded, perspective view of the embodiment of FIG. 5 shown being installed on the underside of a representative automobile and securing a representative exhaust pipe.

Referring now to FIG. 6a, an embodiment of a hanger 100 of the invention that is adapted to mate with a muffler clamp 160 is depicted in FIG. 6a. As shown in FIG. 6, the muffler clamp includes a bolt portion 162, which is generally configured as a U-shaped member having external threads at each of its ends 164, 166. As is commonly known, the bolt member is received about the component that is to be secured. Thus, in FIG. 6a, the bolt member is received about a portion of an exhaust pipe 168. A saddle 170 receives the ends of the bolt member, and the ends are then passed through corresponding holes 172, 174 of the hanger. Secure attachment of the hanger and muffler clamp assembly 10 is facilitated by fixing the bolt and saddle to the arm 102b of the hanger, such as by using nuts 176, 178. Note, in the embodiment depicted in FIG. 6a, a bolt 180 is used to attach the bushing to a portion, e.g., a framed member, 182 of the automobile.

Figure 6B:
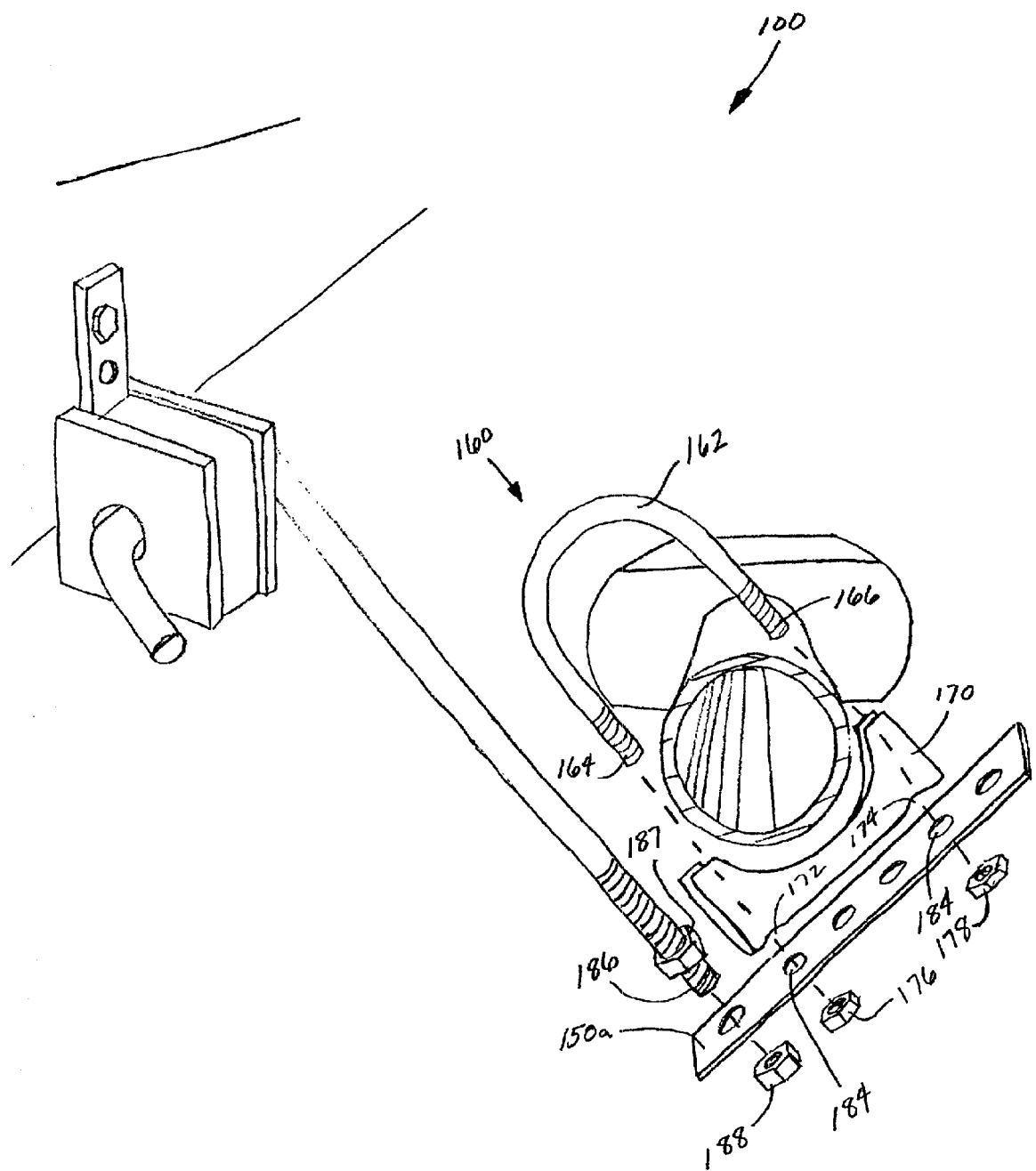
FIG. 6b is partially exploded, perspective view of another embodiment of the present invention shown being installed on the underside of a representative automobile and securing a representative exhaust pipe.

Another embodiment of a hanger 100 of the invention that is adapted to mate with a muffler clamp is depicted in FIG. 6b. As shown in FIG. 6b, muffler clamp 160 includes a bolt portion 162 and has threads at each of its ends 164, 166. A saddle 170 receives the ends of the bolt member by passing the ends through corresponding holes 172, 174 and securing the ends with nuts 176, 178, as described before with respect to FIG. 6a. In FIG. 6b, a clamp-retaining member 150a also is provided that is adapted to receive muffler clamp 160. In particular, clamp-retaining member 150a which, in this case, is formed as a generally flattened member with holes 184 formed therethrough, receives the threaded ends of the bolt 162. Clamp-retaining member 150a then is secured to the arm of the hanger such as be receiving an externally threaded distal end 186 and can be secured to the arm such as by nuts 187, 188. Note, in the embodiment depicted in FIG. 6b, a bolt 180 is used to attach the bushing to the underside of the automobile.

Clearly, other attachment techniques can be used. By way of example, attachment of an embodiment of the hanger to a muffler and to the undercarriage of an automobile without using bolts, is depicted in FIG. 7.

Figure 7:
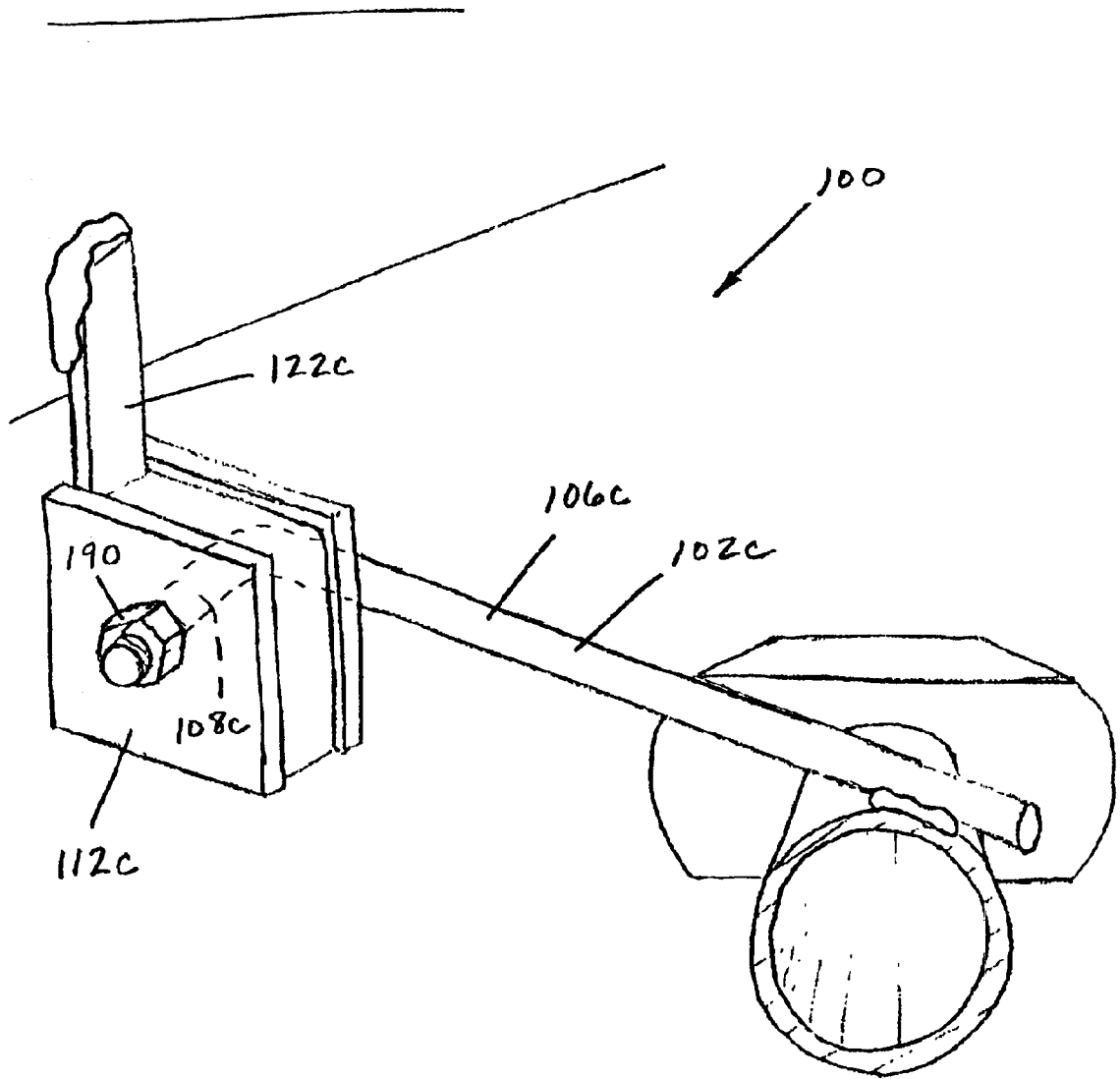
FIG. 7 is a perspective view of an alternative embodiment of the present invention shown installed on the underside of a representative automobile and securing a representative exhaust pipe.

As shown in FIG. 7, the flanged portion 122c, for example, of hanger 100, as well as the arm 102c of the hanger, can be welded to the components to which they are to be secured. Thus, various combinations of securement techniques can be used depending upon the particular application. Note, the arm 102c is secured to an upper portion of the exhaust pipe. Clearly, attachment can occur at various locations. Additionally, note that the flanged portion 122c does not include holes for receiving bolts. Note, flanges with bolt-receiving holes also can be welded.

Of particular interest in FIG. 7 is the configuration of arm 102c. In particular, arm 102c is generally configured with an L-shape. Also note that the proximal end of the arm, which in this case is journal portion 108c, is retained by bushing 112c by trapping the bushing between distal portion 106c and a protruding member 190 that engages the journal portion. More specifically, in the embodiment depicted in FIG. 7, the protruding member 190 is a nut that engages external threads formed at the terminating end of the journal portion. Clearly, various other types and configurations of protrusions, e.g., removable and permanently affixed protrusions, can be used.

The foregoing description has been presented for purposes of illustration and description. It is not intended to be exhaustive or to limit the invention to the precise forms disclosed. Obvious modifications or variations are possible in light of the above teachings. The embodiment or embodiments discussed, however, were chosen and described to provide the best illustration of the principles of the invention and its practical application to thereby enable one of be ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A hanger system for securing an exhaust pipe to the undercarriage of an automobile, the automobile undercarriage having a frame member, said hanger system comprising:

a hanger comprising:
an arm having a proximal end and a distal end;
a bushing defining an orifice, said orifice being adapted for receiving said proximal end of said arm, said arm being configured as a J-shaped member having a journal portion, a distal portion extending between said journal portion and said distal end, and a proximal portion extending between said journal portion and said proximal end, said journal portion being longer than a length of said orifice, said journal portion being slidable within said orifice along a longitudinal axis of said orifice, said proximal end of said arm being loosely retained by said bushing such that said arm is rotatable therein;
a retaining member engaging an exterior surface of said bushing, said retaining member being formed, at least partially, of a strip of material, at least a portion of said strip of material being shaped to conform to at least a portion of said exterior surface of said bushing wherein said strip of material has opposing sides edges, said opposing side edges being intermediately disposed between ends of said bushing such that said arm is prevented from contacting said opposing side edges of said retainer member; and
a flange extending outwardly from said bushing, said flange being an extended portion of said retaining member;
said hanger being configured to mount to the automobile by attaching said flange to the frame member such that said bushing is retained thereby, said arm being securable to a portion of the exhaust system such that the exhaust pipe is securely retained by the undercarriage of the automobile.

2. The hanger of claim 1, further comprising:
a muffler clamp having a bolt and a saddle, said bolt being generally U-shaped with first and second ends, said saddled being configured to retain said first and second ends such that a portion of an exhaust pipe can be clamped between said bolt and said saddle; and
wherein said distal end of said arm has at least two holes formed therethrough, a first of said holes being configured to receive said first end of said generally U-shaped bolt, a second of said holes being configured to receive said second end of said generally U-shaped bolt.

3. The hanger of claim 2, wherein said distal end of said arm is flattened in a vicinity of said first and second holes.

4. The hanger of claim 2, further comprising:
first and second internally threaded nuts, said first nut being configured to mate with said first end of said generally U-shaped bolt, said second nut being configured to mate with said second end of said generally U-shaped bolt such that said saddle is arranged between said distal end of said arm and the exhaust pipe when said muffler clamp and said hanger engage the exhaust pipe.

5. The hanger of claim 1, further comprising:
a muffler clamp having a bolt and a saddle, said bolt being generally U-shaped with first and second ends, said saddled being configured to retain said first and second ends such that a portion of an exhaust pipe can be clamped between said bolt and said saddle; and
a clamp-retaining member attached to said arm and extending outwardly therefrom, said clamp-retaining member having at least two holes formed therethrough, a first of said holes being configured to receive said first end of said generally U-shaped bolt, a second of said holes being configured to receive said second end of said generally U-shaped bolt.

6. The hanger of claim 5, wherein said clamp-retaining member has a substantially flat exterior surface abutting said saddle.

7. The hanger of claim 1, wherein said bushing is formed of a shock-absorbing material.

8. The hanger of claim 7, wherein said arm is rotatable 360° within said orifice of said bushing.

9. The hanger of claim 7, wherein said proximal portion of said arm has a circular cross-section.

10. The hanger of claim 7, wherein said bushing includes an intermediate portion, rectangularly shaped in cross-section, disposed about a central longitudinal axis of said orifice.

11. The hanger of claim 1, wherein said flange is configured for welding to the undercarriage of the exhaust system.

12. The hanger of claim 11, wherein said flange lacks holes for receiving bolts therethrough.

13. A method for securing an exhaust pipe to the undercarriage of an automobile, the automobile undercarriage having a frame member, said method comprising:
   providing a hanger, the hanger comprising:
      an arm having a proximal end and a distal end;
      a bushing defining an orifice, the orifice being adapted for receiving the proximal end of the arm, said arm being configured as a J-shaped member having a journal portion, a distal portion extending between said journal portion and said distal end, and a proximal portion extending between said journal portion and said proximal end, said journal portion being longer than a length of said orifice, said journal portion being slidable within said orifice along a longitudinal axis of said orifice; the proximal end of the arm being loosely retained by the bushing such that the arm is rotatable therein;
      a retaining member engaging an exterior surface of the bushing, the retaining member being formed, at least partially, of a strip of material, at least a portion of the strip of material being shaped to conform to at least a portion of the exterior surface of the bushing wherein said strip of material has opposing sides edges, said opposing side edges being intermediately disposed between ends of said bushing such that said arm is prevented from contacting said opposing side edges of said retainer member; and
      a flange extending outwardly from the bushing said flange being an extended portion of said retaining member;
   attaching the flange to the frame member such that the bushing is fixedly retained thereby; and
   attaching the arm to a portion of the exhaust system such that the exhaust pipe is securely retained by the undercarriage of the automobile.

14. The method of claim 13, further comprising:
   providing a muffler clamp having a bolt and a saddle, the bolt being generally U-shaped with first and second ends, the saddled being configured to retain the first and second ends; such that a portion of an exhaust pipe can be clamped between said bolt and said saddle; and
   wherein attaching the arm to a portion of the exhaust system comprises:
      clamping the muffler clamp to the distal end of the arm such that the portion of the exhaust system is arranged between the distal end of the arm and at least a portion of the muffler claim.

15. The method of claim 13, wherein attaching the arm to a portion of the exhaust system comprises:
   welding the distal end of the arm to the exhaust system.

16. The method of claim 13, wherein attaching the flange to the frame member comprises:
   welding the flange to the frame member.

17. The hanger of claim 1, wherein the strip of material is a rectangular strip of metal that forms the retainer and the flange.

18. The hanger of claim 7, wherein said flange is configured for welding to the undercarriage of the exhaust system.

19. The hanger of claim 18, wherein said flange lacks holes for receiving bolts therethrough.

20. The hanger of claim 7, wherein the strip of material is a rectangular strip of metal.

21. The hanger of claim 7, wherein the shock-absorbing material is rubber.

22. The method of claim 13, wherein said bushing is formed of a shock-absorbing material.

23. The method of claim 13, wherein said arm is rotatable 360° within said orifice of said bushing.

24. The method of claim 13, wherein said proximal portion of said arm has a circular cross-section.

25. The method of claim 13, wherein said bushing includes an intermediate portion, rectangularly shaped in cross-section, disposed about a central longitudinal axis of said orifice.

26. The method of claim 13, wherein attaching the arm to a portion of the exhaust system comprises:
   welding the distal end of the arm to a tailpipe of the exhaust system.

* * * * *